United States Patent [19]

Johnson

[11] 4,066,214
[45] Jan. 3, 1978

[54] GAS TURBINE EXHAUST NOZZLE FOR CONTROLLED TEMPERATURE FLOW ACROSS ADJOINING AIRFOILS

[75] Inventor: Joseph M. Johnson, Bothell, Wash.

[73] Assignees: The Boeing Company, Seattle, Wash.; Aeritalia S.p.A., Napoli, Italy

[21] Appl. No.: 732,520

[22] Filed: Oct. 14, 1976

[51] Int. Cl.$^2$ .............................................. B64C 15/00
[52] U.S. Cl. ................................ 239/265.19; 60/271; 244/53 R
[58] Field of Search ...................... 239/265.11, 265.17, 239/265.19, 265.25; 60/271; 244/53 R, 15

[56] References Cited

U.S. PATENT DOCUMENTS

| | | | |
|---|---|---|---|
| 2,968,150 | 1/1961 | Goebel et al. | 60/271 X |
| 2,991,961 | 7/1961 | Rogallo et al. | 244/12 |
| 3,053,340 | 9/1962 | Kutney | 239/265.11 X |
| 3,154,267 | 10/1964 | Grant | 244/15 |
| 3,174,282 | 3/1965 | Harrison | 60/35.6 |
| 3,393,518 | 7/1968 | Bridge | 60/271 |
| 3,442,471 | 5/1969 | Fischer et al. | 244/53 |
| 3,495,682 | 2/1970 | Treiber | 181/51 |
| 3,655,007 | 4/1972 | Hilbig | 181/33 E |
| 3,704,842 | 12/1972 | Custer | 244/12 CW |
| 3,731,489 | 5/1973 | Monoghan et al. | 60/226 A |

FOREIGN PATENT DOCUMENTS

| | | | |
|---|---|---|---|
| 702,290 | 3/1966 | Italy | 244/42 |
| 653,544 | 5/1951 | United Kingdom | 244/42 |

*Primary Examiner*—John J. Love
*Assistant Examiner*—Michael Mar

*Attorney, Agent, or Firm*—Christensen, O'Connor, Garrison & Havelka

[57] ABSTRACT

An exhaust nozzle for exhausting the effluent of a turbofan gas turbine engine across a portion of the upper surface of an aircraft wing wherein the exhaust nozzle is arranged to establish a temperature profile within the exhausted gases that prevents overheating the wing surface. The nozzle includes a contoured outer housing that longitudinally transists from a circular entrance opening, arranged for interconnection with the rear face of a gas turbine engine, to a semi-elliptical outlet opening located on the upper surface of the aircraft wing. A generally tubular mixer section, of the daisy type, is mounted within the outer housing and coaxially surrounds an engine tail plug. Exhaust gases flowing from the engine fan stage flow through an annular flow duct formed between the inner surface of the forward portion of the outer housing and the outer surface of the mixer section and the high temperature gases flowing from the engine turbine stages flow through an annular duct formed between the tail plug and the inner surface of the mixer section. As the turbine exhaust gases and the fan air flow past the mixer section exit plane, the two fluid streams mix with one another to increase engine thrust and decrease engine noise level. To establish a temperature profile in which the exhaust gases flowing along the aircraft wing do not overheat the wing structure, the outer housing is contoured to have a generally elliptical cross-sectional geometry at the exit plane of the mixer section and the mixer section lobes are of unequal radial dimension such that the mixer section has an asymmetric cross-sectional shape.

11 Claims, 6 Drawing Figures

GAS TURBINE EXHAUST NOZZLE FOR CONTROLLED TEMPERATURE FLOW ACROSS ADJOINING AIRFOILS

BACKGROUND OF THE INVENTION

This invention relates to jet aircraft of a type having gas turbine engine exhaust effluent discharged over the upper surface of a wing or in close proximity to other aircraft structure. More particularly, this invention relates to an exhaust nozzle for a gas turbine engine wherein the temperature of the exhaust effluent is controlled to prevent overheating of aircraft structure in close proximity to the effluxing engine exhaust gases.

In certain types of aircraft, the jet propulsion engines are necessarily arranged so that the thrust producing effluent flows over, or in close proximity to, adjoining aircraft structure. For example, in one type of aircraft employing the so-called blown upper surface techniques, the gas turbine engines are mounted to discharge exhaust gases rearwardly across the upper surface of the wing to thereby increase lift. In such an arrangement, the engines are mounted such that the exhaust effluent flows in a direction substantially parallel to the normal airflow across the upper surface of the wing. Since the exhaust gases produce a greater pressure differential between the upper and lower surface of the wing than would be provided by normal airflow, the wing produces increased lift.

Such an arrangement, although advantageous from an aerodynamic viewpoint, often causes overheating of that portion of the wing surface subjected to the direct impingement of the high temperature turbine exhaust gases. Thus, considerable effort has been directed to designing the adjoining aircraft structure such that the structure will withstand high temperatures or configuring the exhaust arrangement such that overheating will not occur.

One attempt to maintain the temperature of aircraft structure that adjoins a gas turbine engine exhaust orifice within acceptable limits is disclosed in U.S. Pat. No. 3,154,267, issued to C. H. Grant. In the Grant patent, gas turbine engines are located ahead of the aircraft wing and discharge turbine exhaust gases rearwardly across the upper surface of the wing. An air inlet opening coaxially surrounds each engine to duct atmospheric air to the vicinity of the engine tail pipe. The atmospheric air flowing through the air inlet effectively surrounds or blankets the hot exhaust stream prior to impingement of the exhaust stream on the wing surface. Additionally, in some embodiments of the arrangement disclosed by Grant, an air passage having an inlet opening positioned forward of and below the leading edge of the wing directs a sheath of atmospheric air across the portion of the upper surface of the wing that is in proximity to the engine exhaust orifice. This sheath of atmospheric air effectively forms a cool boundary layer or blanket of air between the hot turbine exhaust stream and the wing surface.

Although an arrangement such as that disclosed by Grant can be effective in controlling the temperature of the airfoil surface, such an arrangement requires additional aircraft structure in that additional air passages must be provided and the gas turbine engines must be mounted in a particular orientation. Further, the arrangement disclosed by Grant does not provide the most efficient use of the cooler air to produce maximum engine thrust. In this regard, it is known that the forced mixing of a relatively low velocity, low temperature secondary gaseous flow with the relatively high velocity, high temperature turbine exhaust gases prior to discharging the engine effluent into the atmosphere produces both increased thrust and a lower noise level than are achieved by exhausting the turbine exhaust gases alone. For example, in modern gas turbine engines of the turbofan variety, a portion of the fan air is commonly ducted around the engine compressor, combustor, and turbine stages and is mixed with the turbine exhaust gases either in a mixer stage that is internal to the engine, or in an exhaust nozzle mounted on the rear portion of the engine.

Such mixing arrangements generally include a tubular mixer section coaxially mounted within an airflow duct with the mixer section often being coaxially mounted around an axially extending engine plug. Fan air is introduced into the annular duct formed between the exterior surface of the mixer section and the inner surface of the airflow duct and the turbine exhaust gases are introduced into the annular duct formed between the interior surface of the mixer section and the outer surface of the engine plug. The high temperature, high velocity turbine exhaust mixes with the lower temperature, lower velocity fan air as the two fluid streams flow past the mixer section exit plane.

One type of the above-described mixing apparatus, commonly referred to as a daisy mixer, includes a mixer section having a plurality of axially extending circumferentially spaced lobes or corrugations of increasing radial dimension relative to the axial flow of exhaust gases through the mixer section. The corrugations or lobes "force" mixing of the fluid streams by increasing the peripheral length at the mixer section exit opening to greatly increase the boundary region between the two flow streams and hence cause thorough mixing of the turbine exhaust gases and the fan exhaust gases.

Forced mixing results in increased thrust since the mixed gases have a higher mass-velocity product than the mass velocity product of the turbine exhaust gases alone. Further, since the component of noise produced by the pressure disturbance that is created by the discharged exhaust stream is proportional to the mass velocity of the discharged exhaust stream exponentially raised to a high power (typically 8), the noise produced by an engine including forced mixing is substantially lower than that noise produced by an engine directly exhausting the high velocity turbine gases.

Although such prior art mixed flow arrangements are advantageous in that significantly more thrust is produced and lower noise levels are obtained, prior art forced mixers do not reduce the temperature of the exhausted gases to the point that the mixed exhaust stream can impinge on, or be discharged in close proximity to, conventional aircraft structure. Thus, in relation to upper blown surface arrangements, or other arrangements in which the engine exhaust gases impinge on aircraft structure, the artisan has been faced with the choice of foregoing the significant advantages of forced mixing or using additional means in combination with a mixed flow exhaust to protect the aircraft structure. Such additional means can include special design of the affected aircraft structure, e.g., multiple layers of covering material with or without an internal cooling system, or can include the introduction of additional cooling air that is not forcibly mixed with the exhaust effluent to thereby form a protective boundary layer as is disclosed in the Grant patent. Each of these alternatives complicate the aircraft structure and impose undesirable weight penalties.

Accordingly, it is an object of this invention to provide mixing apparatus for use in engine installations in which exhaust gases are directed across, or in close proximity to, a portion of the aircraft structure wherein the temperature of the adjoining aircraft structure is maintained within an acceptable temperature range.

It is another object of this invention to provide an exhaust arrangement for a gas turbine engine mounted in proximity to other aircraft structure wherein the exhaust effluent does not overheat the adjoining aircraft structure and the engine turbine exhaust is mixed with a cooler gaseous flow to increase the engine thrust and decrease the engine noise level.

It is yet another object of this invention to provide a multilobed forced mixer for use in gas turbine engines that direct engine exhaust gases across adjoining aircraft structure wherein the temperature of the adjoining structure is maintained within acceptable limits.

It is still another object of this invention to provide gas turbine exhaust arrangements supplying the above objectives without increasing the weight or complexity of either the gas turbine engine or the adjoining aircraft structure.

SUMMARY OF THE INVENTION

These and other objects are achieved in accordance with this invention by a gas turbine mixed flow nozzle assembly that includes a daisy type mixer section mounted within a nozzle housing such that the portion of the exhaust gases that exit the nozzle contiguous with, or in close proximity to, adjoining aircraft structure is cooler than the remaining portion of the exhaust stream and does not overheat the adjoining aircraft structure.

More explicitly, in the practice of this invention, the nozzle housing and mixer section are configured and arranged to provide forced mixing of the turbine exhaust gases with a lower temperature gaseous flow stream through the major portion of the exhaust stream while selectively providing less forced mixing throughout portions of the exhaust stream that impinge on, or pass in close proximity to, adjoining aircraft structure. In this manner, the lower temperature portion of the exhaust stream forms a boundary layer along the adjoining structure to effectively insulate the adjoining structure from the higher temperature mixed exhaust flow. Accordingly, the noise and thrust advantages of mixed flow exhaust are achieved while simultaneously maintaining the temperature range without increasing the weight or complexity of the engine or aircraft structure.

In the disclosed embodiment of the invention, the gas turbine engine is mounted forward of an aircraft wing with the engine axial center line positioned somewhat above the upper surface of the wing. A nozzle housing, which forms the aft portion of the engine assembly, is contoured to duct the engine exhaust gases for rearwardly directed discharge across the upper surface of the wing at a point aft of the wing leading edge. To discharge the exhaust gases in the desired manner, the interior passage of the nozzle housing is contoured to provide an aerodynamically smooth transition between a circular entrance opening and a D shaped or semi-elliptical discharge opening. When viewed in longitudinal cross section, the lower portion of the exhaust nozzle effectively forms a ramp that directs the exhaust gases upwardly for discharge across the wing while the upper portion of the nozzle housing is contoured to direct the exhaust gases downwardly toward the nozzle exit opening.

A daisy type mixer section is mounted within the forward portion of the nozzle housing with the mixer section exit plane generally located forward of the leading edge of the aircraft wing. The mixer section coaxially surrounds a tail plug that extends rearwardly from the gas turbine engine with both the plug and the mixer mounted to extend angularly upward relative to the axial center line of the engine to thereby direct the engine exhaust gases upwardly along the ramp region of the nozzle housing.

Like prior art daisy mixers, the mixer section forms a generally annular flow duct for the turbine exhaust gases between the inner surface of the mixer section and the exterior surface of the tail plug. Additionally the mixer section, in cooperation with the nozzle housing, forms a generally annular flow duct for a cooler gaseous flow (e.g., fan air supplied by the engine fan stage) between the exterior surface of the mixer section and the interior surface of the nozzle housing. Unlike prior art daisy type mixer arrangements, the axially extending mixer section lobes are not of equal radial dimension, but are dimensioned such that the cross-sectional geometry of the mixer section is asymmetric in nature. Further, as previously described, the passageway through the nozzle housing is not generally circular in cross section, but transits from a circular entrance opening to a semi-elliptical discharge opening. Preferably, the mixer section and the nozzle housing are configured and arranged such that the mixer section exit plane is obliquely oriented relative to the axial center line of the engine with the cross-sectional geometry of the nozzle housing passageway being elliptical along the mixer exit plane. Those lobes of the mixer section that extend radially along or near the major axis of the elliptical shaped mixing plane are of the greatest radial dimension and the mixer section lobes that extend along or near the minor axis of the elliptical shaped mixing plane are of the least radial dimension. Those mixer lobes located between the major axis and the minor axis are of decreasing radial dimension such that the cross-sectional pattern formed by the mixer lobes is inscribable within an ellipse.

As the high temperature turbine gases and cooling air flow past the mixer section exit plane, the two gases are selectively mixed such that the portion of the exhaust gases that flow along the nozzle housing ramp and exit contiguous with the upper surface of the wing is cooler than the remaining portions of the exhaust stream. In particular, the cooler gaseous stream that flows past the shorter mixer lobes and hence along the ramp region is not as completely mixed with the high temperature turbine gases as is that portion of the cooler gasseous stream that flows past the longer lobes, but instead flows in a substantially less disturbed manner along the nozzle housing ramp and along the surface of the adjoining aircraft wing that is located immediately aft of the nozzle exit opening. Although this cool air is inherently mixed with the turbine gases as the exhaust gases flow across the nozzle ramp region and the wing surface, the temperature of the ramp and the wing are maintained within a range suitable for conventional aircraft materials such as aluminum.

DETAILED DESCRIPTION

Figure 1:
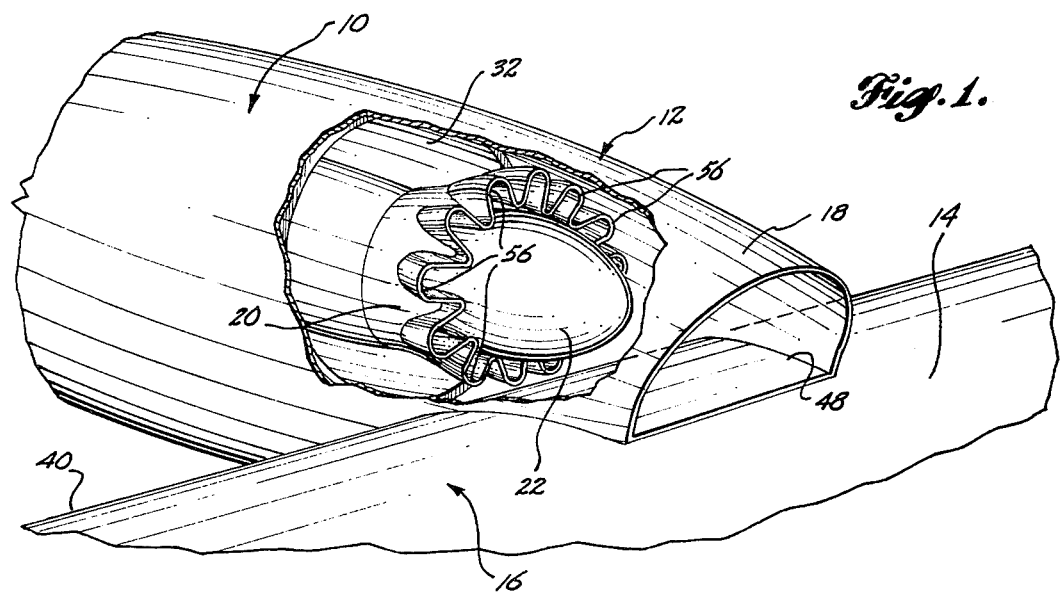
FIG. 1 is a partially cut-away isometric view of a gas turbine engine mounted on an aircraft wing and including a mixer nozzle in accordance with this invention.
Figure 2:
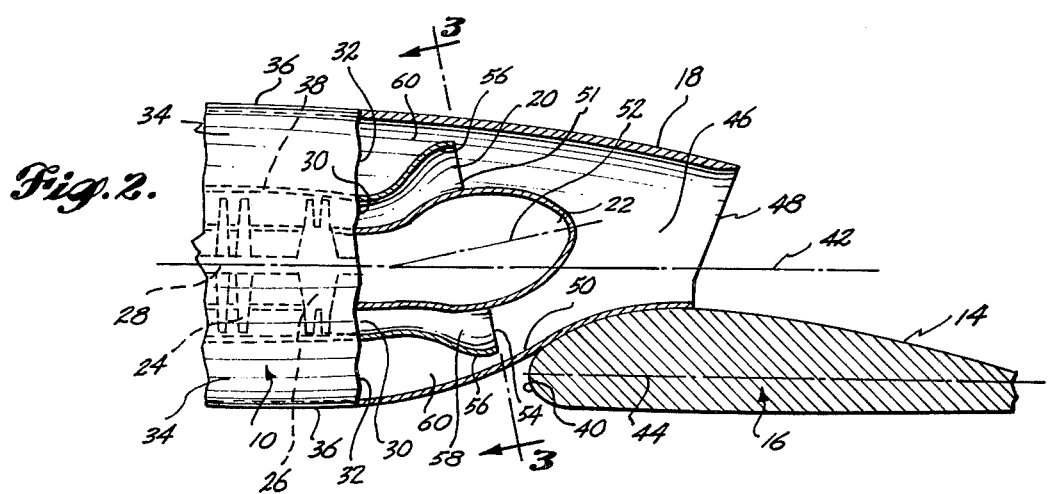
FIG. 2 is a cross-sectional side view of an aircraft wing and a mixer nozzle in accordance with this invention.

FIGS. 1 and 2 depict a portion of a conventional turbofan gas turbine engine 10 coupled to an exhaust nozzle (generally denoted by the numeral 12) structured in accordance with this invention to direct engine exhaust gases across the upper surface 14 of an aircraft wing 16. As shall be described in detail hereinafter, the nozzle assembly 12 includes an outer housing 18, a mixer section 20 and a tail plug 22 with the mixer section 20 centrally mounted within the outer housing 18 and coaxially surrounding the tail plug 22. In this arrangement the nozzle assembly 12 receives turbine exhaust gases and fan air supplied by the engine 10, selectively mixes the two gaseous flow streams with one another, and discharges the mixed flow stream across the upper surface 14 of the wing 16.

As is best depicted in FIG. 2, the engine 10 includes a high pressure turbine 24 and a low pressure turbine 26, each of which are mounted to and rotate with a pair of concentric central shafts 28. As is known in the art, combustion gases, supplied by an engine combustor stage (not shown in FIG. 2), flow serially through the high pressure turbine 24 and the lower pressure turbine 26 to rotate the turbine assemblies and the concentric shafts 28. As these high temperature, high velocity gases flow from the low pressure turbine 26, the gases flow into an annular opening 30 formed between the outer surface of the tail plug 22 and the inner surface of the mixer section 20.

Airflow from a forwarded mounted fan assembly (not shown in FIG. 2) is ducted to a second annular opening 32 of the exhaust nozzle 12 which if formed between the inner surface of the outer housing 18 and the outer surface of the mixer section 20. Ducting of the fan air from the forward mounted fan assembly to the annular opening 32 can be achieved in a variety of ways. In the arrangement of FIGS. 1 and 2, an annular fan duct 34 is formed between an outer covering or cowl 36 of the engine 10 and an inner housing 38 that encases the engine core structure including the turbine stages 24 and 26.

In the arrangement depicted in FIGS. 1 and 2, the engine 10 is mounted forward of the leading edge 40 of the wing 16 with the axial center line 42 of the engine 10 positioned substantially parallel to the cord 44 of the wing 16 and somewhat above the upper surface 14 of the wing 16. The nozzle housing 18 effectively forms a passageway 46 for directing the engine exhaust gases upwardly over the leading edge 40 of the wing 166 for discharge across the wing upper surface 14. It will be recognized by those skilled in the art that, although the nozzle housing 18 is depicted herein as forming an aerodynamically smooth rearwardly extending extension of the engine cowl 36, in actual practice the nozzle housing 18 will generally be a separate duct-like member affixed to the aft face of the engine 10 with the cowl 36 extending over both the engine 10 and the nozzle housing 18. In any case, the cross-sectional geometry of the passageway 46 smoothly transits from circular (at the annular opening 32), to elliptical (at the exit plane of the mixer section 20), to semi-elliptical or D-shaped (at the exit opening 48). When viewed in longitudinal cross section, as shown in FIG. 2, the lower boundary region of the forward portion of the passageway 46 forms a ramp 50 for directing the exhaust gases upwardly over the leading edge 40 of the wing 16 with the aft portion of the ramp 50 following the contour of the upper surface 14. The upper boundary of the passageway 46 smoothly converges downwardly from the upper region of the annular opening 32 to the semi-elliptical exit opening 48. Preferably, the semi-elliptical exit opening 48 extends obliquely from the upper surface 14 of the wing 16 at an angle that causes the exhaust gases to flow smoothly across the wing with the major axis of the semi-elliptical opening 48 coincident with the wing upper surface 14.

The mixer section 20 and the tail plug 22 are rigidly attached to the rear face of the engine 10 in a conventional manner with the mixer section 20 coaxially surrounding the tail plug 22. Relative to the longitudinal direction, the mixer section 20 and tail plug 22 extend angularly upward within the forward portion of the passageway 46, following the general contour of the ramp 50. In one embodiment of the invention, the axial centerline 52 of the mixer section 20 and tail plug 22 is disposed at a 10° angle relative to the axial centerline 42 of the engine 10.

Figure 3:
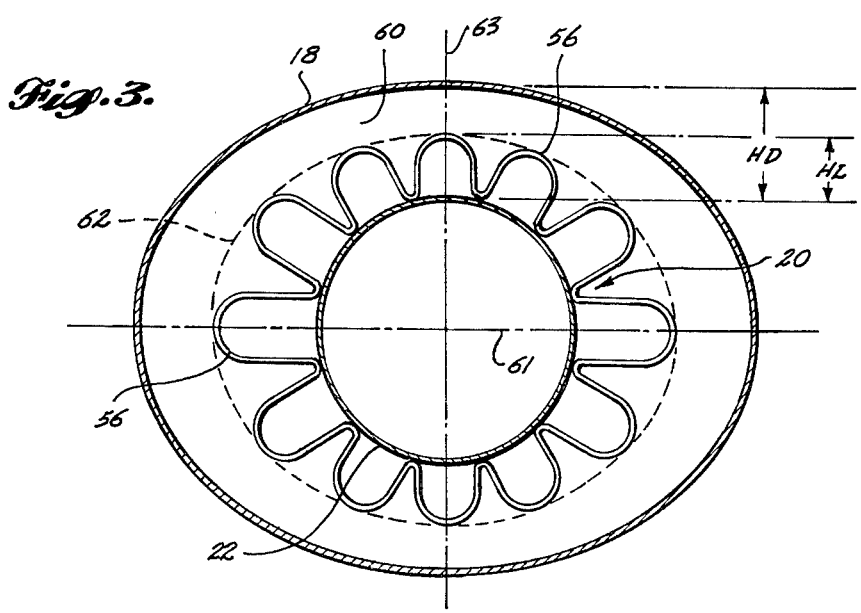
FIG. 3 is an oblique sectional view taken along the mixer exit plane (line 3—3) of the embodiment of this invention depicted in FIG. 2.

The mixer section 20 remains generally circular in cross section for a short distance aft of the annular entrance opening 30 and then is corrugated to form a plurality of lobes 56 that extend axially along the mixer section and are evenly spaced circumferentially thereof. More explicitly, the corrugations in the wall of the mixer section 20 are shallow at the forward end and gradually increase in depth in the downstream of aft direction. Thus, the lobes 56 increase in radial dimension in the downstream direction with the aft edge 54 of the mixer section 20 having a "daisy pedal" shape (FIG. 3). As shall be described in more detail hereinafter, in contrast with prior art mixers of the so-called daisy variety, the lobes 56 of the mixer section 20 are not of equal radial dimension, but are configured to cause selective mixing of the turbine exhaust gases with the fan air.

The tail plug 22 is bulb-like in shape and when viewed in longitudinal cross section (FIG. 2) is contoured to effectively complement the longitudinal contour of the mixer section 20. Specifically, the tail plug 22 is of a generally circular cross section with the cross-sectional area first remaining relatively constant for a short distance aft of the annular opening 30 then smoothly increasing, to reach a maximum cross-sectional area at a point substantially in line with the exit plane (mixing plane) 54 of the mixer 20. Aft of the mixing plane 54, the tail plug 22 decreases in cross-sectional area to form a bullet shaped rear portion that extends rearwardly toward the exit opening 48.

In operation, the high temperature, high velocity turbine exhaust gases flowing from the low pressure turbine 26 enter the annular opening 30 of the nozzle assembly 12 and flow rearwardly through the annular passage 58 formed between the outer surface of the tail plug 22 and the inner surface of the mixer section 20. The relatively cool, relatively low velocity air supplied by the engine fan stage flows into the annular opening 32 of the nozzle assembly 12 and flows through the generally annular duct 60 formed between the inner surface of the outer housing 18 and the outer surface of the mixer section 20. Preferably, the annular passage 58 and the annular passageway 60 each have a relatively constant cross-sectional area. Because of the angular orientation of the tail plug 22 and the mixer section 20, the turbine exhaust gases and the fan air are directed rearwardly and upwardly as the gases flow past the exit plane 54 of the mixer section 20. As the two gas streams flow past the exit plane 54, the relatively large peripheral boundary of the mixer section 20 causes the two gases to be forcibly mixed with one another. Due to the asymmetric cross-sectional lobe geometry of the mixer section 20 and the contour of the nozzle housing 18, the gases are not uniformly mixed but are selectively mixed to maintain the ramp 50 and the upper surface 14 of the wing 16 within a satisfactory temperature range.

Specifically referring to FIG. 3, the cross-sectional geometry of the outer housing 18 at the exit plane 54 is an ellipse having a major axis 61 substantially perpendicular to the axial center line 52 of the mixer section 20 and the tailplug 22. Those lobes 56 of the mixer section 20 that extend outwardly along or near the major axis 61 of the elliptical cross section of the outer housing 18 are of a maximum length, and those lobes 56 that extend outwardly along or near the minor axis 63 of the elliptical cross section are of a lesser length. More explicitly, as can be seen in FIG. 3, the lobes 56 of the mixer section 20 are dimensioned such that the cross-sectional pattern of the mixer section 20 is inscribable within an ellipse (denoted by the dashed line 62 in FIG. 3).

In most embodiments of this invention, the elliptical outline 62 is concentric with the elliptical cross-sectional geometry of the housing 18 in that each ellipse has an identical center point, but the ratio between the major axis of the two ellipses is not generally equal to the ratio between the minor axis. Thus the radial distance between the inside surface of the outer housing 18 and the crest or outermost region of each lobe 56 is not constant. The optimal dimensioning of the duct cross section and the dimensioning of the lobes 56 will vary somewhat from one embodiment of the invention to another, dependent at least in part on the contour of the ramp 50 and parameters of the fan air and turbine exhaust such as the relative gas temperature and pressure. Thus, a certain amount of experimentation is generally advantageous to optimize each particular embodiment. It has been determined however, that each embodiment can be described by a penetration ratio $H_L/H_D$ where, as indicated in FIG. 3, $H_D$ is the maximum radial dimension of the duct 60 at the exit plane 54 (i.e., the radial distance between the inner surface of the nozzle housing 18 and the channel between adjacent lobes 56) and $H_L$ is the radial length of each lobe 56 at the exit plane 54. In this respect, it has been found that a penetration ratio equal to or less than 0.80 provides satisfactory operation of the invention.

Figure 4:
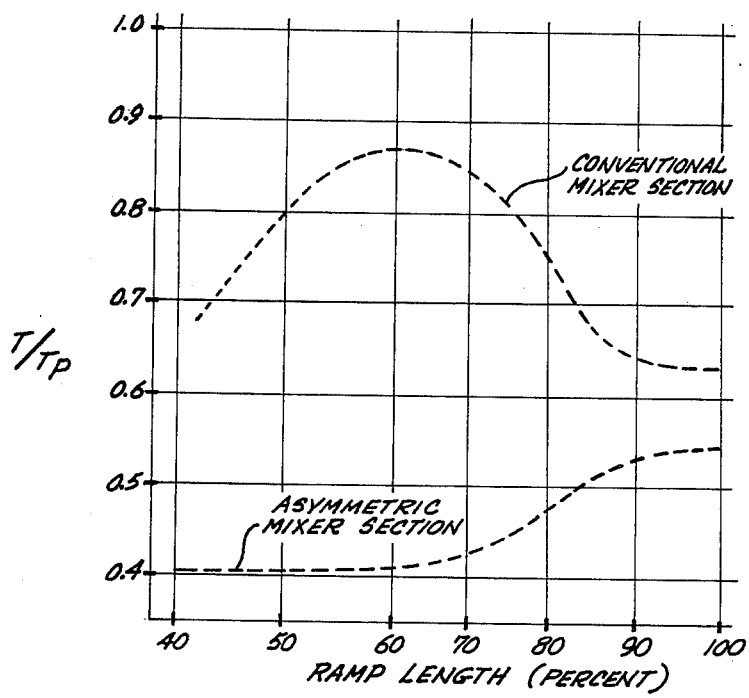
FIG. 4 graphically depicts the reduction in temperature effected by a typical embodiment of this invention relative to a conventionally configured mixer section.

FIG. 4 depicts the performance of a typical embodiment of this invention in maintaining the ramp 50 and upper surface 14 of a wing 16 within a satisfactory temperature range, and further depicts the temperature resulting when a conventional daisy type mixer section, having lobes of equal radial dimension, is employed within the nozzle housing 18. In FIG. 4, the temperature at the surface of ramp 50 is plotted as a ratio $T/T_P$, where T is the temperature at a particular point along the ramp 50, and $T_P$ is the temperature within the central portion of the primary exhaust stream at the mixing plane 54.

The embodiment of the invention utilized to effect the temperature control depicted in FIG. 4 includes a 12-lobe mixer section 20, wherein the mixer section 20 and the tail plug 22 extend upwardly within the housing 18 at an angle of 10° relative to the axial center line 42 of the engine 10. In this embodiment, the center point of the mixer exit plane 54 is located at a point substantially 25% of the distance along the ramp 50 and the lobes 56 are dimensioned as previously described. With this arrangement, the temperature of the ramp 50 and the upper surface 14 of the wing 16 is approximately 40% of the temperature within the central region of the exhaust flow from just aft of the exit plane 54 to a point approximately 65% of the way along the ramp 50. Aft of this point, the temperature of the ramp 50 gradually increases due to inherent free-mixing of the relatively cool gaseous flow along the ramp 50 with the adjoining, warmer gaseous flow of the central portion of the exhaust stream. This free-mixing is caused by velocity gradients producing turbulence within the gaseous flow. In contrast, when a symmetrical 12-lobe daisy mixer is utilized in the same nozzle arrangement, the ratio between the ramp temperature and the temperature at the central region of the exhaust stream increases from approximately 65% just aft of the exit plane 54 to approximately 87% at a point approximately 63% of the way along the ramp 50. Aft of this point, the temperature ratio decreases, reaching a temperature ratio of approximately 65% at the exit opening 48. Accordingly, it can be observed in FIG. 4 that the depicted performance of the invention significantly decreases the temperature along the ramp 50 and the wing 16 and hence permits discharge of the exhaust gases directly across the wing 16 without requiring specially structured wing sections. Further, as previously described, the mixing provided by the invention is advantageous in that the mixed exhaust flow produces higher thrust than a corresponding engine where the turbine exhaust is exhausted directly into the atmosphere. It has in fact been found that the practice of this invention increases thrust performance over that achieved when a conventional daisy type mixer is utilized within the nozzle housing 18.

Figure 5:
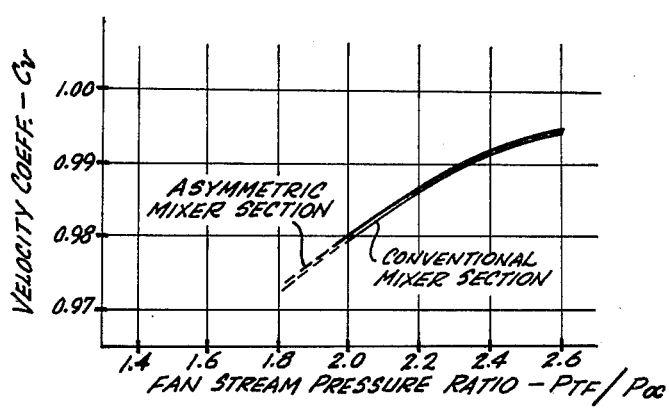
FIGS. 5 and 6 graphically depict the thrust performance of a typical embodiment of this invention relative to the performance of a conventionally configured mixer section.
Figure 6:
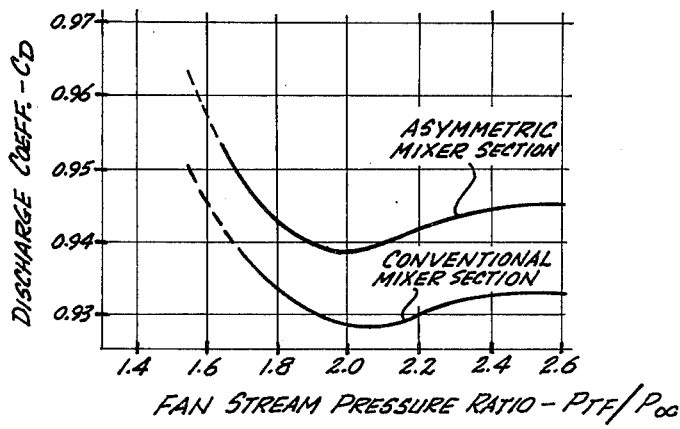

The improved thrust performance of this invention is illustrated in FIGS. 5 and 6 which depict the velocity coefficient, $C_v$, and the discharge coefficient, $C_d$, for the same embodiment of this invention that supplied the temperature control depicted in FIG. 4. In particular, FIG. 5 depicts the velocity coefficient of this embodiment of the invention and further depicts the velocity coefficient of the same nozzle arrangement utilizing a conventional 12-lobe mixer section. In a similar manner, FIG. 6 depicts the discharge coefficient of this embodiment of the invention and further depicts the discharge coefficient of the identical nozzle arrangement utilizing a conventional mixer section. It can be noted in viewing FIGS. 5 and 6 that the velocity coefficient of the embodiment of the invention and the nozzle utilizing a conventional mixer section are substantially identical, with the velocity coefficient increasing as a function of the fan stream pressure ratio, $P_{TF}/P_{oo}$. It can be noted in FIG. 6, however, that, for each value of fan stream pressure ratio, the discharge coefficient of this invention is substantially greater than the discharge coefficient for the nozzle arrangement utilizing a conventional 12-lobe mixer section. Since the product of the velocity coefficient and the discharge coefficient is a measure of the thrust performance provided by any nozzle arrangement, it can thus be realized that the invention provides improved thrust performance over a similar nozzle arrangement utilizing a conventional mixer section.

It will be recognized by those skilled in the art that the depicted embodiment is exemplary in nature and that many variations therein may be practiced without departing from the scope and spirit of this invention. For example, although the depicted embodiment is directed to the discharge of engine effluent across the upper surface of an aircraft wing, the invention can be suitably configured for other engine mounting arrangements such as those wherein an engine is mounted in close proximity to an aircraft fuselage, or aircraft tail section. Further, although the invention has been described in terms of an exhaust nozzle, the selective mixing arrangement can be practiced in conjunction with mixer sections located internal to a gas turbine engine for controlling the temperature of the engine duct structure.

What is claimed is:

1. An exhaust nozzle for use with a gas turbine engine having a rearwardly extending tail plug wherein said gas turbine engine is mountable near adjoining structure so as to discharge exhaust effluent in close proximity to said adjoining structure, said exhaust nozzle for selectively mixing the relatively high temperature, high velocity exhaust gases supplied by said gas turbine engine with a lower temperature secondary gaseous stream to prevent overheating of said adjoining structure, said exhaust nozzle comprising:

a generally tubular mixer section having an entrance opening at one end thereof for receiving said exhaust gases and a plurality of axially extending lobes spaced about the periphery of said tubular mixer section, each of said lobes of increasing radial dimension relative to the length of said mixer section to form an aft terminus of said mixer section having a relatively large periphery relative to the periphery of said entrance opening, the radial dimension of each of said lobes being established to asymmetrically pattern the cross-sectional geometry of said mixer section, said mixer section coaxially mounted about said tail plug for forming a first generally annular flow duct between said tail plug and said mixer section for the flow of said turbine exhaust gases; and a nozzle housing mounted about said coaxially mounted mixer section and engine tail plug to form a second generally annular flow duct for the flow of said secondary gaseous stream, said second flow duct formed between said mixer section and said nozzle housing, said nozzle housing extending rearwardly from said aft terminus of said mixer section and terminating in an exit opening for discharging a fluid stream including said turbine exhaust gases and said secondary gases, said nozzle housing contoured and arranged relative to said mixer section for selectively mixing said turbine exhaust gases with said secondary gaseous stream to maintain at least selected regions of said discharged fluid stream adjacent said nozzle housing at a lower temperature than the temperature of the central region of said discharged fluid stream.

2. The exhaust nozzle of claim 1 wherein the cross-sectional geometry of said mixer section aft terminus is inscribable within an ellipse.

3. The exhaust nozzle of claim 2 wherein said nozzle housing has a generally circular entrance opening for receiving said secondary gaseous stream, said nozzle housing being contoured to form a passageway that smoothly transists from said circular entrance opening to an elliptical cross-sectional geometry coplanar with said aft terminus of said mixer section and smoothly transists from said elliptical cross-sectional geometry at said mixer section aft terminus to a semi-elliptical cross-sectional geometry at said nozzle housing exit opening.

4. The exhaust nozzle of claim 3 wherein said ellipse inscribable about said mixer section aft terminus is positioned with a major axis thereof substantially coincident with a major axis of the coplanar elliptical geometry of said nozzle housing.

5. The exhaust nozzle of claim 4 wherein said secondary gaseous stream is fan air discharged from a fan stage of said gas turbine engine.

6. The exhaust nozzle of claim 5 wherein said exhaust nozzle is arranged for discharging said discharge fluid stream rearwardly across an upper surface of an aircraft wing, said gas turbine engine being mountable forward of the leading edge of said wing with the axial centerline of said engine positioned above said upper surface of said wing, said passageway of said nozzle housing including a lowermost portion contoured to form a ramp for directing said fan air and said turbine exhaust gases upwardly across the leading edge portion of said wing, said coaxially mounted mixer section and tail plug extending angularly upward in spaced relationship with said ramp.

7. An exhaust nozzle for controlling the temperature of gas turbine exhaust effluent discharged in close proximity to adjoining structure, said exhaust nozzle connectable to a rear face of a gas turbine engine having at least one turbine stage, a fan stage and a rearwardly extending tail plug, said exhaust nozzle comprising:

a generally tubular mixer section coaxially mounted about said gas turbine engine tail plug, said mixer section having a substantially circular entrance opening mountable to said rear face of said gas turbine engine for receiving turbine exhaust gases discharged from said turbine stage of said engine, said mixer section having a periphery including a plurality of axially extending circumferentially spaced lobes of increased radial dimension relative to the direction of flow of said turbine exhaust gases, said mixer section terminating in a mixing plane having an asymmetric cross-sectional geometry; and a nozzle housing including an interior passageway, said nozzle housing passageway having a substantially circular entrance opening mountable to said rear face of said gas turbine engine for receiving fan air discharged from said fan stage of said engine, said nozzle housing passageway extending rearwardly beyond said mixer section mixing plane to a discharge opening in an aft portion of said nozzle housing, said passageway being smoothly contoured for directing said fan air past said mixing section mixing plane, said asymmetric cross-sectional geometry of said mixer section mixing plane being dimensioned and arranged to forcibly mix portions of said fan air flowing adjacent said mixer section with outermost portions of said turbine exhaust gases flowing through said mixer section with outermost portions of said turbine exhaust gases flowing through said mixer section, said asymmetric cross-sectional geometry of said mixer section mixing plane being dimensioned and arranged to forcibly mix portions of said fan air flowing adjacent said mixer section with outermost portions of said turbine exhaust gases flowing through said mixer section, said asymmetric cross-sectional geometry of said mixer section being further dimensioned and arranged for maintaining substantially undisturbed flow within portions of said fan air located along the boundaries of said passageway.

8. The exhaust nozzle of claim 7 wherein said discharge opening of said nozzle housing passageway is mountable on the upper surface of an aircraft wing for discharging said exhaust effluent across said upper surface of said wing in a direction substantially parallel to the normal airflow across said wing, said circular entrance opening of said nozzle housing passageway and said circular entrance opening of said mixer section being mountable to the aft face of a gas turbine engine positioned forward of said wing with the axial centerline of said turbine engine being positioned substantially parallel to and above the cord of said aircraft wing.

9. The exhaust nozzle of claim 8 wherein said asymmetric cross-sectional geometry of said mixer section mixing plane is inscribable within a first ellipse with the outermost portion of each of said mixer section lobes being tangential to said first ellipse.

10. The exhaust nozzle of claim 9 wherein the cross-sectional geometry of said discharge opening of said nozzle housing passageway is substantially semi-elliptical in shape, a major axis of said semi-elliptical discharge opening being substantially coincident with said upper surface of said wing, and wherein the cross-sectional geometry of said nozzle housing passageway along a plane common to said mixing plane of said mixer section forms a second ellipse concentric with said first ellipse inscribable about said mixer section mixing plane, the major axis of said second ellipse being substantially coicident with the major axis of said first ellipse, said passageway of said nozzle housing being smoothly contoured to transist from said circular entrance opening to said second elliptical cross-sectional geometry and smoothly contoured to transist from said second elliptical cross-sectional geometry to said semi-elliptical discharge opening.

11. The exhaust nozzle of claim 10 wherein said tail plug and said mixer section extend angularly upward from said rear face of said gas turbine engine at a predetermined angle, a lower portion of said nozzle housing being contoured in a rearwardly extending direction to form a ramp for directing said fan air and said turbine exhaust gases upwardly across a forward portion of said upper surface of said wing for discharge through said nozzle housing discharge opening, the upper region of said nozzle housing passageway being contoured to converge smoothly downward along said rearwardly extending direction.

* * * * *